United States Patent
Sebire et al.

(10) Patent No.: US 10,594,612 B2
(45) Date of Patent: Mar. 17, 2020

(54) THRESHOLD FOR REDUCED LATENCY MECHANISMS

(71) Applicant: Nokia Technologies Oy, Espoo (FI)

(72) Inventors: Benoist Pierre Sebire, Tokyo (JP); Elena Virtej, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/752,402

(22) PCT Filed: Aug. 13, 2016

(86) PCT No.: PCT/FI2016/050601
§ 371 (c)(1),
(2) Date: Feb. 13, 2018

(87) PCT Pub. No.: WO2017/037343
PCT Pub. Date: Mar. 9, 2017

(65) Prior Publication Data
US 2019/0007324 A1    Jan. 3, 2019

Related U.S. Application Data

(60) Provisional application No. 62/214,332, filed on Sep. 4, 2015.

(51) Int. Cl.
*H04L 12/801*    (2013.01)
*H04W 28/02*    (2009.01)
(Continued)

(52) U.S. Cl.
CPC .......... *H04L 47/193* (2013.01); *H04L 1/0015* (2013.01); *H04L 47/27* (2013.01);
(Continued)

(58) Field of Classification Search
None
See application file for complete search history.

(56) References Cited

U.S. PATENT DOCUMENTS

2005/0276266 A1*  12/2005  Terry .................... H04L 1/0003
                                                                370/394
2008/0232266 A1    9/2008  Jitsui et al.
(Continued)

FOREIGN PATENT DOCUMENTS

EP       2871897 A1     5/2015
WO    2011/083452 A1    7/2011
(Continued)

OTHER PUBLICATIONS

Tentative Rejection received for corresponding Taiwan Patent Application No. 105128434, dated Feb. 7, 2018, 8 pages of Tentative Rejection and 0 pages of translation available.
(Continued)

*Primary Examiner* — Lonnie V Sweet
(74) *Attorney, Agent, or Firm* — Harrington & Smith

(57) ABSTRACT

In accordance with example embodiments of the invention there is at least a method and apparatus to perform communicating in a network at least one packet over a transport protocol connection, identifying that latency reduction procedures for the transport protocol connection are to be performed, and preventing based on predetermined criteria specific ones of the latency reduction procedures from being performed. Further, in accordance with the example embodiments there is at least a method and apparatus to perform identifying that latency reduction procedures for a transport protocol connection with a mobile device in a network are to be performed, determining that specific ones of the latency reduction procedures are not to be performed, and providing to the mobile device an indication of predetermined criteria to identify the specific ones of the latency reduction procedures that are not to be performed.

20 Claims, 4 Drawing Sheets

(51) Int. Cl.
*H04L 12/841* (2013.01)
*H04L 1/00* (2006.01)
*H04L 29/06* (2006.01)
*H04L 12/807* (2013.01)
*H04W 28/06* (2009.01)
*H04L 12/26* (2006.01)

(52) U.S. Cl.
CPC .......... *H04L 47/283* (2013.01); *H04L 69/163* (2013.01); *H04W 28/02* (2013.01); *H04W 28/0236* (2013.01); *H04W 28/065* (2013.01); *H04L 43/0852* (2013.01); *H04W 28/0278* (2013.01)

(56) References Cited

U.S. PATENT DOCUMENTS

| | | | |
|---|---|---|---|
| 2010/0246398 A1* | 9/2010 | Chiang | H04L 43/0829 370/235 |
| 2013/0235843 A1 | 9/2013 | Gohari et al. | |
| 2014/0286256 A1 | 9/2014 | Chowdhury et al. | |
| 2015/0124604 A1 | 5/2015 | Dao et al. | |
| 2019/0116000 A1* | 4/2019 | Thubert | H04L 1/0035 |
| 2019/0147884 A1* | 5/2019 | Hirani | G10L 15/285 704/231 |
| 2019/0182063 A1* | 6/2019 | Singh | G06Q 10/06315 |
| 2019/0199642 A1* | 6/2019 | Jiang | H04L 43/12 |

FOREIGN PATENT DOCUMENTS

| | | |
|---|---|---|
| WO | 2013/086362 A1 | 6/2013 |
| WO | 2015/055243 A1 | 4/2015 |

OTHER PUBLICATIONS

Office Action received for corresponding Taiwan Patent Application No. 105128434, dated Jul. 6, 2018, 4 pages of office action and 0 pages of translation available.

Extended European Search Report received for corresponding European Patent Application No. 16840885.4, dated Feb. 13, 2019, 11 pages.
"New SI Proposal: Study on Latency Reduction Techniques for LTE", 3GPP TSG-RAN meeting #67, RP-150465, Agenda: 13.1.2, Ericsson, Mar. 9-12, 2015, 7 pages.
"Areas for Latency Reduction", 3GPP TSG-RAN Working Group 2 meeting #91, R2-153489, Agenda: 7.11, Ericsson, Aug. 24-28, 2015, pp. 1-7.
"Evaluation of TTI Reduction Gain with Additional L1/L2 Overhead", 3GPP TSG-RAN Working Group 2 meeting #91, R2-153292, Agenda: 7.11, Intel Corporation, Aug. 24-28, 2015, pp. 1-3.
"Performance Evaluation of Latency Reduction Enhancements", 3GPP TSG-RAN Working Group 2 meeting #91, R2-153223, Agenda: 7.11, Nokia Networks, Aug. 24-28, 2015, 7 pages.
"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321, V12.6.0, Jun. 2015, pp. 1-77.
"Potential area for Latency Reduction", 3GPP TSG-RAN WG2 Meeting #91, R2-15xxx4, LG Electronics Inc., Agenda Item : 7.11 (FS_LTE_LATRED), Aug. 24-28, 2015, pp. 1-4.
"Study of Shorter TTI for Latency Reduction", 3GPP TSG-RAN Working Group 2 meeting #91, R2-153493, Agenda: 7.11, Ericsson, Aug. 24-28, 2015, pp. 1-5.
"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.6.0, Jun. 2015, pp. 1-449.
International Search Report received for corresponding Patent Cooperation Treaty Application No. PCT/FI2016/050601, dated Nov. 30, 2016, 16 pages.
"Uplink Latency Reduction for Synchronized UEs", 3GPP TSG-RAN Working Group 2 meeting #91, R2-153374, Agenda: 7.11, Huawei, Aug. 24-28, 2015, 5 pages.
"3rd Generation Partnership Project; Technical Specification Group Radio Access Network; Evolved Universal Terrestrial Radio Access (E-UTRA); Study on latency reduction techniques for LTE (Release 13)", 3GPP TR 36.881, V0.2.0 , Jun. 2015, pp. 1-20.

* cited by examiner

THRESHOLD FOR REDUCED LATENCY MECHANISMS

RELATED APPLICATION

This application was originally filed as PCT Application No. PCT/FI2016/050601, filed on Aug. 31, 2016, which claims priority from U.S. Application No. 62/214,332, filed on Sep. 4, 2015.

TECHNICAL FIELD

The teachings in accordance with the example embodiments of this invention relate generally to least a method and apparatus to identify whether certain ones, or all, of TCP latency avoidance mechanisms should be implemented based on whether the TCP latency avoidance mechanisms would be overly cost intensive and potentially detrimental and, more specifically, relate to implementing a new threshold value parameter which is used to control whether mechanisms tailored to reduce latency are used or not by a network device.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
3GPP 3rd Generation Partnership Project
BLER block error ratio
CCE control channel element
CQI channel quality indicator
CSI channel state information
DC dual connectivity
ACK acknowledgement
BSR buffer status report
DCI downlink control information
FTP file transfer protocol
HARQ hybrid automatic repeat request
HTTP hypertext transfer protocol
ICMP internet control message protocol
LTE long term evolution
MCS modulation and coding scheme
OLLA outer loop link adaptation
PDCCH physical downlink control channel
PDCP packet data convergence protocol
PPI power preference indicator
Rel-13 release 13
RRC radio resource control
RSRP reference signal received power
RSRQ reference signal received quality
RTT round trip time
SCell secondary cell
SDU service data unit
SR scheduling request
TCP transmission control protocol
TTI transmission time interval
UDP user datagram protocol
UE user equipment TCP provides reliability, network adaptability, congestion control and flow control. Reliability is generally provided by using mechanisms such as sequence numbers to enable retransmission. Network adaptability and flow control are generally provided by using mechanisms such as windows or thresholds (e.g. congestion window size (cwnd), receiver window size (rwnd), slow start threshold (ssthresh)). For congestion control of TCP signaling a TCP congestion control mechanism is used to limit the amount of data that can be transmitted in a network.

A TCP congestion control mechanism functions to adjust the rate with which the protocol sends packets to the network using a congestion control window. A good congestion control mechanism can fully utilize the bandwidth while avoiding over-driving the network and thereby creating packet losses.

To avoid network congestion, a TCP sender always maintains a window (congestion window) such that the number of packets in flight do not exceed the receiver's ability to receive the packets. The function of a TCP congestion control mechanism is to perform TCP flow control by adjusting a flow rate with which the protocol sends packets to the network using a congestion control window.

The example embodiments of the invention work to improve control of congestion control mechanisms associated with TCP and/or any other communication protocol.

SUMMARY

This section contains examples of possible implementations and is not meant to be limiting.

In one example embodiment of the invention, a method comprises communicating, by an apparatus, in a network at least one packet over a transport protocol connection, identifying, by the apparatus, that latency reduction procedures for the transport protocol connection are to be performed, and preventing based on predetermined criteria, by the apparatus, specific ones of the latency reduction procedures from being performed.

A further example embodiment is a method comprising the method of the previous paragraph wherein the predetermined criteria is received in an indication from the network via at least one of radio resource control and system information broadcast signaling, and wherein the predetermined criteria is based on at least one of link quality measures, a transport layer used, a timer value, and at least one threshold. Another example embodiment is the method of this paragraph and/or the previous paragraph wherein the at least one threshold value is based on at least one of the link quality measures and a volume of service data units in buffered packets at the apparatus. A further example embodiment is the method of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. Another example embodiment is the method of this paragraph and/or the previous paragraph wherein the link quality measures are using at least one of reference signal received power, reference signal received quality, channel state information and channel quality indicator measurements. An additional example embodiment is the method of this paragraph and/or the previous paragraph wherein the indication from the network comprises a bitmap indicating the specific ones of the latency reduction procedures that are not to be performed based on the at least one threshold value being one of exceeded or not met. A further example embodiment is the method of this paragraph and/or the previous paragraph wherein when an amount of service data units buffered at packet data convergence protocol is below a threshold of the at least one threshold, the latency reduction procedures comprise at least one of: using a short transmission time interval, using a scheduling request specific for short transfers, and using a preamble for a random access procedure which originates from a separate pool reserved for short transfers, and using a contention-based uplink. In still another example embodiment is the method of this paragraph and/or the previous paragraph wherein the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the mobile device is in dual connectivity mode, and a power saving mode is not set at the apparatus; wherein if a power saving mode is set at the apparatus, then the latency reduction procedures are not used.

In another example embodiment of the invention a computer program product comprises a computer-readable storage medium bearing computer program code embodied therein for use with a computer, the computer program code comprising: code for communicating in a network at least one packet over a transport protocol connection; code for identifying that latency reduction procedures for the transport protocol connection are to be performed; and code for preventing based on predetermined criteria specific ones of the latency reduction procedures from being performed.

In a further example embodiment of the invention there is an apparatus comprising at least one processor; and at least one memory including computer program code, where the at least one memory and the computer program code are configured, with the at least one processor, to cause the apparatus to at least: communicate in a network at least one packet over a transport protocol connection; identify that latency reduction procedures for the transport protocol connection are to be performed; and prevent based on predetermined criteria specific ones of the latency reduction procedures from being performed.

A further example embodiment is an apparatus comprising the apparatus of the previous paragraph wherein the predetermined criteria is received in an indication from the network via at least one of radio resource control and system information broadcast signaling, and wherein the predetermined criteria is based on at least one of link quality measures, a transport layer used, a timer value, and at least one threshold. Another example embodiment is the apparatus of this paragraph and/or the previous paragraph wherein the at least one threshold value is based on at least one of the link quality measures and a volume of service data units in buffered packets at the apparatus. Another example embodiment is the apparatus of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. A further example embodiment is the apparatus of this paragraph and/or the previous paragraph wherein the link quality measures are using at least one of reference signal received power, reference signal received quality, channel state information and channel quality indicator measurements. A further example embodiment is the apparatus of this paragraph and/or the previous paragraph wherein the indication from the network comprises a bitmap indicating the specific ones of the latency reduction procedures that are not to be performed based on the at least one threshold value being one of exceeded or not met. An additional example embodiment is the apparatus of this paragraph and/or the previous paragraph wherein when an amount of service data units buffered at packet data convergence protocol is below a threshold of the at least one threshold, the latency reduction procedures comprise at least one of using a short transmission time interval, using a scheduling request specific for short transfers, and using a preamble for a random access procedure which originates from a separate pool reserved for short transfers, and using a contention-based uplink. A further example embodiment is the apparatus of this paragraph and/or the previous paragraph wherein the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the apparatus is in dual connectivity mode, and a power saving mode is not set at the apparatus; and wherein if a power saving mode is set at the apparatus, then the latency reduction procedures are not used. A further example embodiment is the apparatus of this paragraph and/or the previous paragraph there is user equipment comprising the the apparatus of this paragraph and/or the previous paragraph.

In another example embodiment of the invention there is an apparatus comprising means for communicating in a network at least one packet over a transport protocol connection; means for identifying that latency reduction procedures for the transport protocol connection are to be performed; and means for preventing based on predetermined criteria specific ones of the latency reduction procedures from being performed.

A further example embodiment is an apparatus comprising the apparatus of the previous paragraph wherein the predetermined criteria is received in an indication from the network via at least one of radio resource control and system information broadcast signaling, and wherein the predetermined criteria is based on at least one of link quality measures, a transport layer used, a timer value, and at least one threshold. An additional example embodiment is the apparatus of this paragraph and/or the previous paragraph wherein the at least one threshold value is based on at least one of the link quality measures and a volume of service data units in buffered packets at the apparatus. A further example embodiment is the apparatus of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. An additional example embodiment is the apparatus of this paragraph and/or the previous paragraph wherein the link quality measures are using at least one of reference signal received power, reference signal received quality, channel state information and channel quality indicator measurements. A further example embodiment is the apparatus of this paragraph and/or the previous paragraph wherein the indication from the network comprises a bitmap indicating the specific ones of the latency reduction procedures that are not to be performed based on the at least one threshold value being one of exceeded or not met. A further example embodiment is the apparatus of this paragraph and/or the previous paragraph wherein when an amount of service data units buffered at packet data convergence protocol is below a threshold of the at least one threshold, the latency reduction procedures comprise at least one of: using a short transmission time interval, using a scheduling request specific for short transfers, and using a preamble for a random access procedure which originates from a separate pool reserved for short transfers, and using a contention-based uplink. Another further example embodiment is the apparatus of this paragraph and/or the previous paragraph wherein the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the apparatus is in dual connectivity mode, and a power saving mode is not set at the apparatus; wherein if a power saving mode is set at the apparatus, then the latency reduction procedures are not used. In a further example embodiment is the apparatus of this paragraph and/or the previous paragraph wherein the means for communicating, identifying, and preventing comprise at least one interface to a network, at least one processor, and at least one memory including computer program code executed by the at least one processor.

In another example embodiment of the invention, a method comprises identifying, by an apparatus, that latency reduction procedures for a transport protocol connection with a mobile device in a network are to be performed; determining, by the apparatus, that specific ones of the latency reduction procedures are not to be performed; and providing, by the apparatus, to the mobile device an indication of predetermined criteria to identify the specific ones of the latency reduction procedures that are not to be performed.

A further example embodiment is a method comprising the method of the previous paragraph wherein the predetermined criteria is provided via at least one of radio resource control and system information broadcast signaling, and wherein the predetermined criteria is based on at least one of link quality measures, a transport layer used, a timer value, and at least one threshold. A further example embodiment is the method of this paragraph and/or the previous paragraph wherein the at least one threshold value is based on a volume of service data units in buffered packets at the mobile device. Another example embodiment is the method of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. A further example embodiment is the method of this paragraph and/or the previous paragraph wherein the link quality measures are using at least one of reference signal received power, reference signal received quality, channel state information and channel quality indicator measurements. Another example embodiment is the method of this paragraph and/or the previous paragraph wherein the indication comprises a bitmap indicating the specific ones of the latency reduction procedures that are not to be performed based on the at least one threshold value being one of exceeded or not met. A further example embodiment is the method of this paragraph and/or the previous paragraph wherein the indication comprises an indication that the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the mobile device is in dual connectivity mode, and a power saving mode is not set at the apparatus; and wherein if a power saving mode is set at the mobile device, then the latency reduction procedures are not used. In another example embodiment of the invention of the operations of this paragraph and/or the previous paragraph are performed by a base station.

In still another example embodiment of the invention there is a computer program product comprising a computer-readable storage medium bearing computer program code embodied therein for use with a computer, the computer program code comprising: code for identifying that latency reduction procedures for a transport protocol connection with a mobile device in a network are to be performed; code for determining that specific ones of the latency reduction procedures are not to be performed; and code for providing to the mobile device an indication of predetermined criteria to identify the specific ones of the latency reduction procedures that are not to be performed.

In still another example embodiment of the invention there is an apparatus comprising: at least one processor; and at least one memory including computer program code, where the at least one memory and the computer program code are configured, with the at least one processor, to cause the apparatus to at least: identify that latency reduction procedures for a transport protocol connection with a mobile device in a network are to be performed; determine that specific ones of the latency reduction procedures are not to be performed; and provide to the mobile device an indication of predetermined criteria to identify the specific ones of the latency reduction procedures that are not to be performed.

A further example embodiment is an apparatus comprising the apparatus of the previous paragraph wherein the predetermined criteria is provided via at least one of radio resource control and system information broadcast signaling, and wherein the predetermined criteria is based on at least one of link quality measures, a transport layer used, a timer value, and at least one threshold. In a further example embodiment is the apparatus of this paragraph and/or the previous paragraph wherein the at least one threshold value is based on a volume of service data units in buffered packets at the mobile device. Another example embodiment is the apparatus of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. In a further example embodiment is the apparatus of this paragraph and/or the previous paragraph wherein the link quality measures are using at least one of reference signal received power, reference signal received quality, channel state information and channel quality indicator measurements. In an additional example embodiment is the apparatus of this paragraph and/or the previous paragraph wherein the indication comprises a bitmap indicating the specific ones of the latency reduction procedures that are not to be performed based on the at least one threshold value being one of exceeded or not met. In a further example embodiment is the apparatus of this paragraph and/or the previous paragraph wherein the indication comprises an indication that the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the apparatus is in dual connectivity mode, and a power saving mode is not set at the apparatus; and wherein if a power saving mode is set at the mobile device, then the latency reduction procedures are not used. In another example embodiment of the invention of the apparatus of this paragraph and/or the previous paragraph is embodied in a base station.

In yet another example embodiment of the invention there is an apparatus comprising: means for identifying that latency reduction procedures for a transport protocol connection with a mobile device in a network are to be performed; means for determining that specific ones of the latency reduction procedures are not to be performed; and means for providing to the mobile device an indication of predetermined criteria to identify the specific ones of the latency reduction procedures that are not to be performed.

A further example embodiment is an apparatus comprising the apparatus of the previous paragraph wherein the predetermined criteria is provided via at least one of radio resource control and system information broadcast signaling, and wherein the predetermined criteria is based on at least one of link quality measures, a transport layer used, a timer value, and at least one threshold. In a further example embodiment is the apparatus of this paragraph and/or the previous paragraph wherein the at least one threshold value is based on a volume of service data units in buffered packets at the mobile device. In another example embodiment is the apparatus of this paragraph and/or the previous paragraph wherein the timer is used one of alone or in conjunction with a threshold of the at least one threshold to determine whether to allow or prevent latency reduction techniques, and wherein the timer is based on at least one of a transport time and a round trip time of a communicated packet. In a further example embodiment is the apparatus of this paragraph and/or the previous paragraph wherein the link quality measures are using at least one of reference signal received power, reference signal received quality, channel state information and channel quality indicator measurements. In a further example embodiment is the apparatus of this paragraph and/or the previous paragraph wherein the indication comprises a bitmap indicating the specific ones of the latency reduction procedures that are not to be performed based on the at least one threshold value being one of exceeded or not met. In a further example embodiment is the apparatus of this paragraph and/or the previous paragraph wherein the means for identifying, determining, and providing comprise at least one interface to a network, at least one processor, and at least one memory including computer program code executed by the at least one processor.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose at least a method and apparatus which uses at least a new threshold parameter, such as but not limited to a "data volume threshold" parameter to identify whether TCP latency avoidance mechanisms should be implemented such as based on whether the TCP latency avoidance mechanisms would be overly cost intensive and/or cause system detriment.

Figure 1:
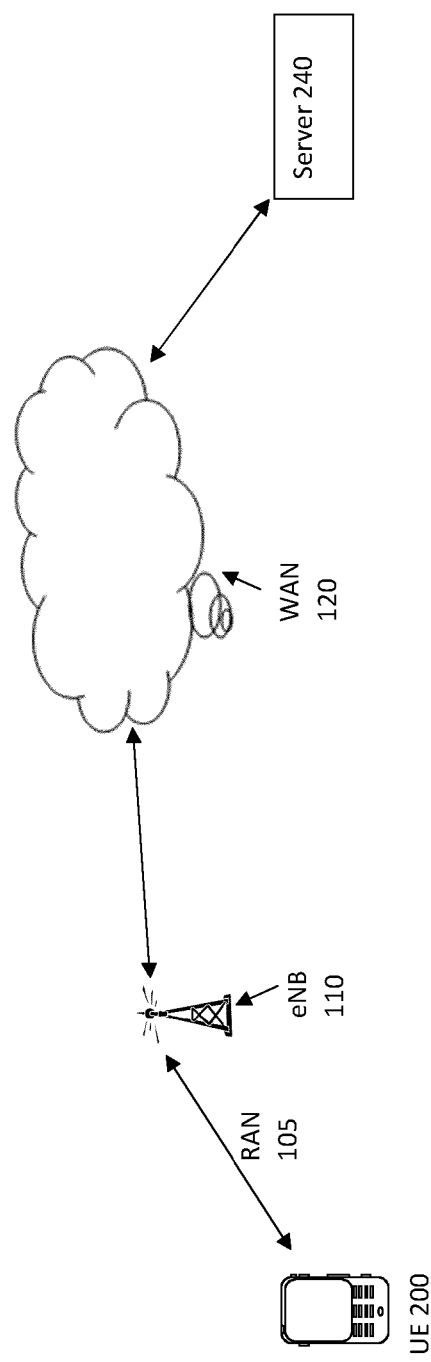
FIG. 1 shows a general overview of devices performing communication including a transmission control protocol.

FIG. 1 illustrates an example of an overview of concepts as described herein. As shown in FIG. 1, user equipment (UE 200), such as a mobile device, may communicate with a server as part of a TCP session (illustrated by the arrowed lines between the UE 200 and the server 240). The physical transport layer for the TCP session may span a number of different types of network segments, such as a RAN 105 and a wide area network (WAN 120) (e.g., the Internet). The radio interface corresponding to the RAN may be implemented via a UE connecting, over a radio connection, to an eNB 110 (e.g., an eNB in an LTE network). The eNB 110 may include queues that are used to buffer traffic before the traffic is transmitted to the RAN 105 and to the UE 200.

A level of fullness for a particular one of the queues may generally represent a level of congestion in the RAN 105. For example, when a particular UE 200 has a low-quality radio connection to the eNB 110, the queue, corresponding to that connection, may tend to become full as incoming packets for the particular UE 200 are buffered before transmission over the RAN 105.

Consistent with aspects described herein, a TCP optimization component may filter packets in the TCP session to optimize the TCP session based on the state of the queues. The TCP optimization component may receive information relating to a state of the queues from the eNB 110. The TCP optimization component may, for example, determine whether to modify a TCP window parameter field in each packet, such as by decreasing the value of the TCP window parameter when a queue is congested The TCP window parameter may be used by the server, in accordance with the TCP protocol, when subsequently controlling the flow of packets transmitted to the UE. By modifying the TCP window parameter field, the TCP optimization component may indirectly control the flow of packets transmitted to the UE. In one implementation, packet filtering performed by the TCP optimization component may be performed at wire speed. For example, the optimization component may be implemented using a field programmable gate array (FPGA), application specific integrated circuit (ASIC), or other hardware mechanism capable of efficiently and quickly processing packets.

The TCP optimization component may be based on the queue state information from the eNB, and may control the packet flow of a TCP session based on a direct indication of congestion/signal quality in the RAN 105. Because the RAN network segment is frequently a limiting factor in traffic flow for a TCP session, the traffic flow for the TCP session can be effectively optimized. The optimization may advantageously be performed or not performed by a device that is transparent to the operation of the endpoints of the TCP session (e.g., the UE 200 and/or the server 240). The example embodiments of the invention seek to improve TCP flow control by providing a novel method and apparatus to at least identify whether or not such TCP latency avoidance mechanisms, such as described above, should be implemented or prevented from being implemented.

As similarly stated above, to avoid network congestion a TCP sender always maintains a window (congestion window) such that the number of packets in flight do not exceed a receiver's ability to receive the packets. TCP flow control has two stages: one is the slow start stage (or the exponential growth stage) and the second is the congestion avoidance stage (or the linear stage).

TCP slow-start is part of the congestion control strategy used by TCP, the data transmission protocol used by many Internet applications. Slow-start is used in conjunction with other algorithms to avoid sending more data than the network is capable of transmitting, that is, to avoid causing network congestion. Slow-start is one of the algorithms that TCP uses to control congestion inside the network. It is also known as the exponential growth phase. Slow-start begins initially with a congestion window size e.g., 1, 2 or 10 segments. The value of the Congestion Window will be increased with each acknowledgment received, effectively doubling the window size each round trip time ("although it is not exactly exponential because the receiver may delay its ACKs, typically sending one ACK for every two segments that it receives"). The transmission rate will be increased with slow-start algorithm until either a loss is detected, or the receiver's advertised window is the limiting factor, or the slow start threshold is reached. If a loss event occurs, TCP assumes that it is due to network congestion and takes steps to reduce the offered load on the network. These measurements depend on the used TCP congestion avoidance algorithm. Once the slow start threshold is reached, TCP changes from slow-start algorithm to the linear growth (congestion avoidance) algorithm. At this point, the window is increased by at least one segment for each RTT.

It is noted that although the strategy is referred to as "Slow-Start", its congestion window growth is quite aggressive, more aggressive than the congestion avoidance phase. Before slow-start was introduced in TCP, the initial pre-congestion avoidance phase was even faster. Furthermore, a TCP connection starts with a slow start period during which the congestion window size is effectively doubled with each TCP acknowledgement received. The window is increased until it reaches a threshold (called slow start threshold) or until a packet is lost. After reaching the threshold the window size is increased linearly with each TCP acknowledgement received. With shorter latency and shorter RTT, the receiver may acknowledge TCP packets faster, which then enables an increase in the TCP window size faster. Due to this effect a reduced UL latency can have a large impact on TCP DL performance.

The 3GPP standards body has recently agreed a Study Item investigating new techniques to reduce the latency. Some of these study items are discussed below as "RP" items. With regards to the "RP" items as identified in this paper, the abbreviation "RP" relates to a 3GPP TSG-RAN (Technical Specification Group-Radio Access Network) meeting or 3GPP TSG-RAN meeting documents (i.e. RAN Plenary). According to [RP-150465]:

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP RATs was one performance metric that guided the design of LTE. LTE is also now recognized by the end-users to be a system that provides faster access to internet and lower data latencies than previous generations of mobile radio technologies. In the 3GPP community, much effort has been put into increasing data rates from the first release of LTE (release 8) until the most recent one (release 12). Features like Carrier Aggregation (CA), 8×8 MIMO, 256 QAM have raised the technology potential of the L1 data rate from 300 Mbps to 4 Gbps. In Rel-13, 3GPP aims to introduce even higher bit rates by introducing up to 32 component carriers in CA. However, w.r.t further improvements specifically targeting the delays in the system little has been done. Packet data latency is important not only for the perceived responsiveness of the system; it is also a parameter that indirectly influences the throughput. HTTP/TCP is the dominating application and transport layer protocol suite used on the internet today. According to HTTP Archive (http://httparchive.org/trends.php) the typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can rather easily be shown to improve the average throughput, for this type of TCP-based data transactions. In addition, to achieve really high bit rates (in the range of Gbps with Rel-13 CA), UE L2 buffers need to be dimensioned correspondingly. The longer the RTT is, the bigger the buffers need to be. The only way to reduce buffering requirements in the UE and eNB side is to reduce latency.

Because shorter latency is expensive to provide and can increase overhead, the overall effect is not always significant for the user or can be even detrimental to the system. As explained in 3GPP R2-153489, since the initial window size for each TCP connection is very small and the increase steeper for each size increment, the effect of latency reductions for both RTT and HARQ RTT are more considerable for the slow start phase. This is important, as the impact is large for small file sizes, especially where the slow start period last for the entire duration of the file. Further, system level simulations provided in R2-153292 it is discussed that that for higher size FTP download using TCP, the user perceived throughput may be degraded in the shorter TTI if additional L1/L2 overhead is high. Further system level simulations provided by Nokia® in R2-153223 also show that potential gain from having shorter TTI depends on how much L1/L2 overhead is assumed and the load of the cell.

As explained above, mechanisms tailored to reduce latency may not always be beneficial so it seems obvious to try using them only when the conditions guaranteeing gains are met. For instance, the network could rely on buffer status reports [3GPP TS 36.321] or even scheduling requests enhanced with 1 bit indicator as suggested by R2-153161 to check whether the UE has enough data to send or not. Furthermore, the TTI length could be dynamically adjusted via RRC reconfiguration or dynamically via DCI as suggested by R2-153493. The prior art described above does not detail the network implementations nor mentions the possibility of introducing new triggers for UE autonomous actions. UE autonomous actions are deemed most efficient to minimize the TCP slow start phase.

In accordance with the example embodiments of the invention there is implemented a novel method and apparatus to be used to identify whether TCP latency avoidance mechanisms should be implemented based on whether the TCP latency avoidance mechanisms would be overly cost intensive and/or cause system detriment.

In accordance with the example embodiments these mechanisms tailored to reduce latency (for example short TTI and/or SR specific for short transfers and/or the preamble used for the random access procedure originates from a separate pool reserved for short transfers and/or contention-based UL) are applied when the use of such latency reduction techniques are most beneficial. On the other hand when those do not give gain or even cause loss, certain ones, or all, of the latency reduction techniques are not used. The example embodiments propose a new threshold value, such as a data volume threshold, which is used to control whether mechanisms tailored to reduce latency are used or not by UE.

In one example embodiment, when the amount of SDUs buffered at a PDCP is above the threshold, mechanisms tailored to reduce latency are not used by the network device. The example embodiments enable the use and termination (preventing) of particular TCP latency avoidance mechanisms based on a threshold value as described herein. The example embodiments provide a means to terminate specific latency reduction mechanisms based on the threshold value.

When the amount of SDUs buffered at PDCP is below the threshold, mechanisms tailored to reduce latency are used by the UE. For instance, a short TTI is used, or an SR specific for short transfers is used, or the preamble used for the random access procedure originates from a separate pool reserved for short transfers, or contention-based UL is used.

Another point is that whether mechanisms tailored to reduce latency are used or not is controlled not only by "a data volume threshold", but also by other criteria, such as link quality measures, transport layer used, or even a timer. All kinds of criteria need to be signaled to the UE.

In accordance with non-limiting embodiments this can mean that the short TTI is used when the UE's connection is in the TCP slow start phase, where the most benefit out of short TTI is seen. When the TCP connection is running full speed, longer e.g. 1 ms legacy TTI could be used instead. The example embodiments enable the network and/or its devices to maintain better control of use of latency reduction mechanisms. In addition, although the example embodiments may be used is a 4G LTE system, the example embodiments may also be used in a 5G system since frame structure flexibility for low latency is also presently promoted as features in the 5G system.

Figure 2:
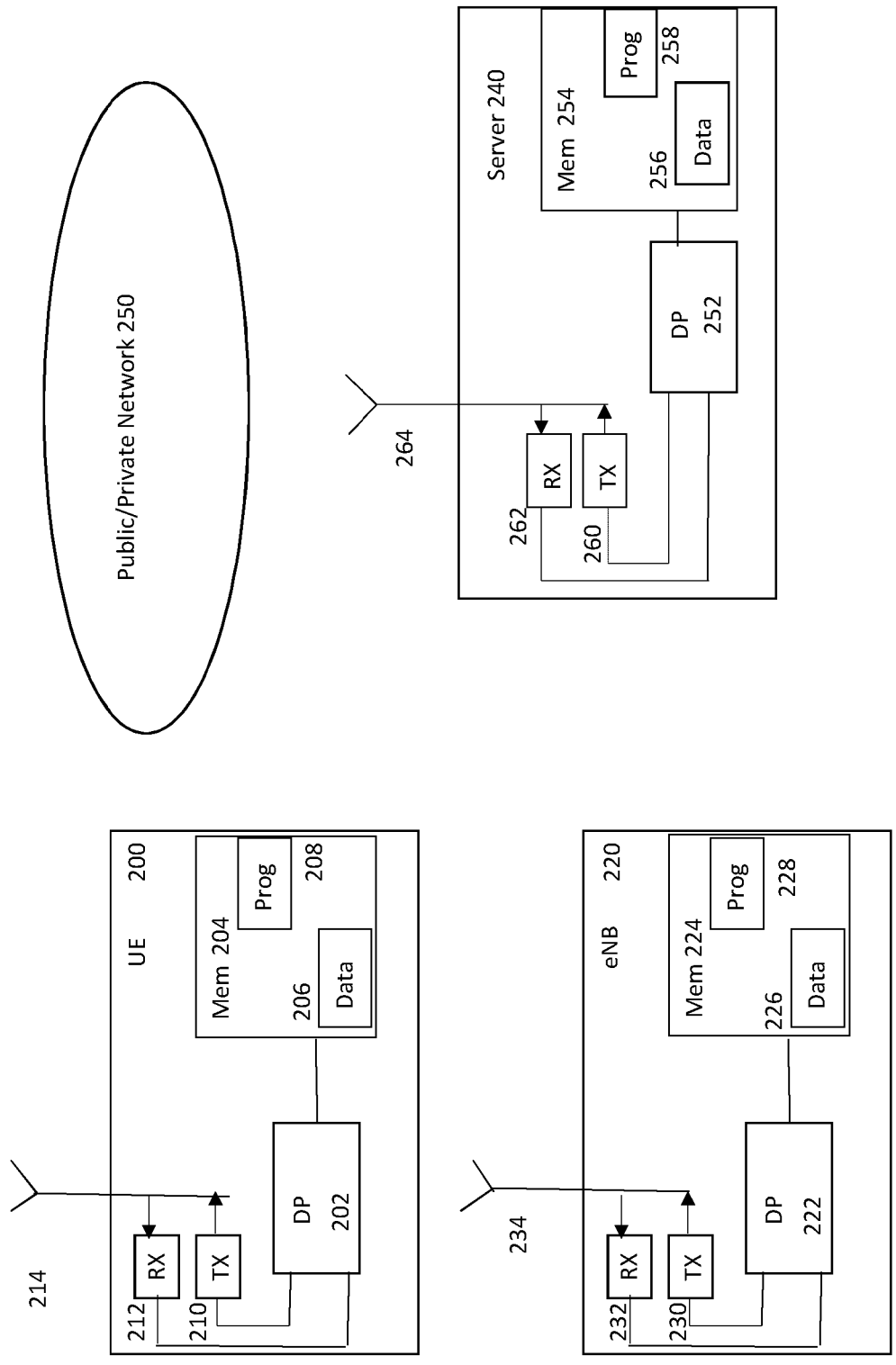
FIG. 2 shows a simplified block diagram of devices configured to perform operations in accordance with the example embodiments of the invention.

Before describing the example embodiments of the invention in further detail reference is now made to FIG. 2. FIG. 2 illustrates a simplified block diagram of a base station such as an eNB 220, a user device(s) such the UE 200, and a computing device such as the server 240 suitable for use in practicing the example embodiments of this invention. In FIG. 2 an apparatus, such as the UE 200, the eNB 220, and the server 240 is adapted for communication with each other and other apparatuses having wireless communication capability, such as devices of the Public/Private Network 250 which can comprise the Internet and/or the WAN 120 for example. In accordance with the embodiments of the invention there is at least determining which one(s) of different flow control latency reduction procedures, if any, may be performed for TCP communications between the UE 200, the eNB 220, the server 240, and/or the public/private network 250.

The UE 200 includes processing means such as at least one data processor (DP) 202, storing means such as at least one computer-readable memory (MEM) 204 storing data 206 and at least one computer program (PROG) 208 or other set of executable instructions, communicating means such as a transmitter TX 210 and a receiver RX 212 for bidirectional wireless communications with the eNB 220 and/or the Server 240 via an antenna 214.

The eNB 220 includes processing means such as at least one data processor (DP) 222, storing means such as at least one computer-readable memory (MEM) 224 storing data 226 and at least one computer program (PROG) 228 or other set of executable instructions, communicating means such as a transmitter TX 230 and a receiver RX 232 for bidirectional wireless communications with the UE 200 and/or the Server 240 via an antenna 234.

The server 240 includes processing means such as at least one data processor (DP) 252, storing means such as at least one computer-readable memory (MEM) 254 storing data 256 and at least one computer program (PROG) 258 or other set of executable instructions, communicating means such as a transmitter TX 260 and a receiver RX 262 for bidirectional wireless communications with the UE 200 or the eNB 220 via one or more antennas and/or a hard line connection 264. The server 240, e.g. if capable of dual connectivity, may have multiple transmitters TX and receivers RX to enable simultaneous communication with UE 200 and eNB 220. In addition, it is noted that although FIG. 2 may only illustrate one transmitter TX and one receiver RX in the UE 200, the eNB 220, and the server 240 this is non-limiting in accordance with the example embodiments and these devices can each be configured to simultaneously support multiple RX and/or TX communications or chains with multiple devices. In accordance with the example embodiments the data 206, 226, and/or 256 may include data required to implement a method and operate an apparatus in accordance with the example embodiments of the invention.

At least one of the PROGs 208 in the UE 200 is assumed to include a set of program instructions that, when executed by the associated DP 202, enable the device to operate in accordance with the example embodiment to at least determine whether TCP latency avoidance mechanisms, as described herein, should be implemented. In these regards the example embodiments of this invention may be implemented at least in part by computer software stored on the MEM 204, which is executable by the DP 202 of the UE 200, or by hardware, or by a combination of tangibly stored software and hardware (and tangibly stored firmware).

Similarly, at least one of the PROGs 228 in the eNB 220 is assumed to include a set of program instructions that, when executed by the associated DP 222, at least enable the device to operate in accordance with the example embodiment to at least determine whether TCP latency avoidance mechanisms, as described herein, should be implemented. In these regards the example embodiments of this invention may be implemented at least in part by computer software stored on the MEM 224, which is executable by the DP 222 of the eNB 220, or by hardware, or by a combination of tangibly stored software and hardware (and tangibly stored firmware).

Similarly, at least one of the PROGs 258 in the server 240 is assumed to include a set of program instructions that, when executed by the associated DP 252, enable the device to operate in accordance with the example embodiments of this invention, as detailed above. In these regards the example embodiments of this invention may be implemented at least in part by computer software stored on the MEM 254, which is executable by the DP 252 of the server 240, or by hardware, or by a combination of tangibly stored software and hardware (and tangibly stored firmware). Electronic devices implementing these aspects of the invention need not be the entire devices as depicted at FIG. 2 or may be one or more components of same such as the above described tangibly stored software, hardware, firmware and DP, or a system on a chip SOC or an application specific integrated circuit ASIC.

In general, the various embodiments of the UE 200 can include, but are not limited to personal portable digital devices having wireless communication capabilities, including but not limited to cellular telephones, navigation devices, laptop/palmtop/tablet computers, smart watches, wearables, digital cameras and music devices, and Internet appliances.

Various embodiments of the computer readable MEM 204, 224, and 254 include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DP 202, 222, and 252 include but are not limited to general purpose computers, special purpose computers, microprocessors, digital signal processors (DSPs) and multi-core processors.

The embodiments of the invention are now discussed from the perspective of a UE such as the UE 200 and a base station such as the eNB 220.

From the UE side, such as the UE 200 of FIG. 2, the network signals a threshold which mechanisms tailored to reduce latency are not used by the UE. For instance a data volume threshold:

When the amount of SDUs buffered at PDCP is below the threshold, mechanisms tailored to reduce latency are used by the UE.

PDCP is one layer of the Radio Traffic Stack in LTE and performs IP header compression and decompression, transfer of user data and maintenance of sequence numbers for radio bearers.

For instance when the amount is below the threshold:
 a short TTI is used;
 an SR specific for short transfers is used;
 the preamble used for the random access procedure originates from a separate pool reserved for short transfers;
 contention-based UL is used; and/or Alternatively, the threshold value e.g., the data volume threshold can also tell the UE that after transmitting the indicated amount of data, mechanisms tailored to reduce latency are not used. Typically this would translate into having the UE using the techniques only during the TCP slow-start phase.

Instead or in addition to the data volume threshold for buffered SDUs or amount of buffered SDUs for a given logical channel or amount of data transmitted, other criteria may be used as well. These could be for example link quality measures (e.g. Reference Signal Received Power (RSRP), Reference Signal Received Quality (RSRQ) thresholds or CQI (Channel Quality Indicator)/CSI (Channel State Information) thresholds) so that the UE would use the mechanisms for latency reduction only if the link quality is sufficiently good. Also, a combination of different criteria could be used.

The eNB can determine whether to use latency reduction for a UE based on UE's reported CQI/CSI and OLLA offset applied to the CQI/CSI. For example, in case the result is high enough support a certain MCS, eNB would enable latency reduction for UE. In another example if BLER level or MCS level are better than a certain threshold e.g. good enough to use 1 CCE aggregation level on PDCCH, then latency reduction is used. Also, a combination of different criteria could be used.

RSRP is a received signal strength indicator (RSSI) type of measurement. It is the power of reference signals spread over a full bandwidth and narrowband. RSSI measures the average total received power observed in OFDM symbols containing reference symbols for an antenna port (i.e., OFDM symbol in a slot) in the measurement bandwidth over a number (N) of resource blocks. The RSSI can include power from co-channel serving and non-serving cells, adjacent channel interference, thermal noise, etc.

RSRQ is a type of measurement that indicates a quality of the received reference signal. The RSRQ measurement provides additional information when RSRP is not sufficient such as to make a reliable handover or cell reselection decision. RSRQ may also consider the RSSI and a number of used Resource Blocks measured over the same bandwidth, or (N) RSRQ=(N*RSRP)/RSSI. In a handover procedure for example, the LTE specification provides the flexibility of using RSRP, RSRQ, or both.

The specific enhancements not to be used once the threshold is exceeded can also be signaled from the eNB to the UE via RRC. For instance by means of a bitmap indicating methods that should not be used once the threshold is exceeded (or conversely, the methods that can only be used below the threshold).

In another embodiment, for a UE configured with carrier aggregation, UE uses latency reduction if at least one SCell is in activated state. If UE is in dual connectivity mode, UE could use the latency reduction; if UE is not in dual connectivity then latency reduction technique is not used or prevented from being used.

Further, in another example embodiment if powerPrefIndication is set to normal, then UE could be allowed to use latency reduction; if powerPrefIndication is set to lowPowerConsumption then certain ones or all of latency reduction techniques could be prevented from being used.

In addition, in any radio access technology, not just LTE, if a UE is in a power saving mode then latency reduction techniques may be prevented from being used. While if the UE is not in a power saving mode then latency reduction techniques may be allowed.

In another embodiment, in addition to the threshold(s) or instead of it (them), the type of transport layer (UDP or TCP), radio bearer or a timer could be used as criteria to determine whether mechanisms tailored to reduce latency can or cannot be used. For example, an internet ping using ICMP could always be allowed to use mechanisms tailored to reduce latency. Further, in accordance with an example embodiment a timer can be used, alone or in conjunction with a threshold to determine whether to allow or prevent latency reduction techniques. The timer may be based on a transport time, RTT for example, of the ICMP packet or any other type of traffic. Then based on the timer value and/or the threshold latency reduction techniques can be prevented or allowed to occur. Timer values may be provided by a network operator, automatically configured by a device performing the communication, and/or configured by a user of the device. Regardless of the traffic being carried, mechanisms tailored to reduce latency could also always be used for e.g. the first 100 TTIs of the data transfer. Finally, signaling radio bearers could always be allowed and as long as a MAC PDU carries an SDU for a signaling radio bearer, the mechanisms tailored to reduce latency could be used.

In addition, it is noted that the different criteria as described herein can be used in any combination for determining whether certain ones or all of threshold latency reduction techniques could be prevented from being used.

From the network side, such as the eNB 220 of FIG. 2, OAM configures the eNB with the threshold above which mechanisms tailored to reduce latency are not used. A similar behavior as above is expected.

The signaling of the threshold value from eNB to the UE could be done using RRC signaling either via dedicated RRC signaling and/or System Information Broadcast.

In accordance with the example embodiments the threshold value is an integer and may be based on values associated with the link quality (for example RSRQ, RSRP, CQI, CSI) and/or the data volume as discussed herein. In addition, as stated above the threshold may be based on a BLER level and/or MCS level. Further, the threshold value is dynamic and can change at any time based on the RSRQ, RSRP, CQI, CSI and/or the data volume as discussed herein. Further, the threshold value can update or change at regular or intermittent intervals based on changes to any of the RSRQ, RSRP, CQI, CSI, and/or the data volume and/or change at intervals which may be set by an operator of a device or the network. In accordance with another example embodiments, and in possible addition to the threshold value, a criteria may be configured based on the type of protocol used (ICMP, UDP or TCP), or based whether a radio bearer is configured by the eNB as being allowed or not allowed to use latency reduction techniques, or based on a timer also configured by the eNB.

Figure 3:
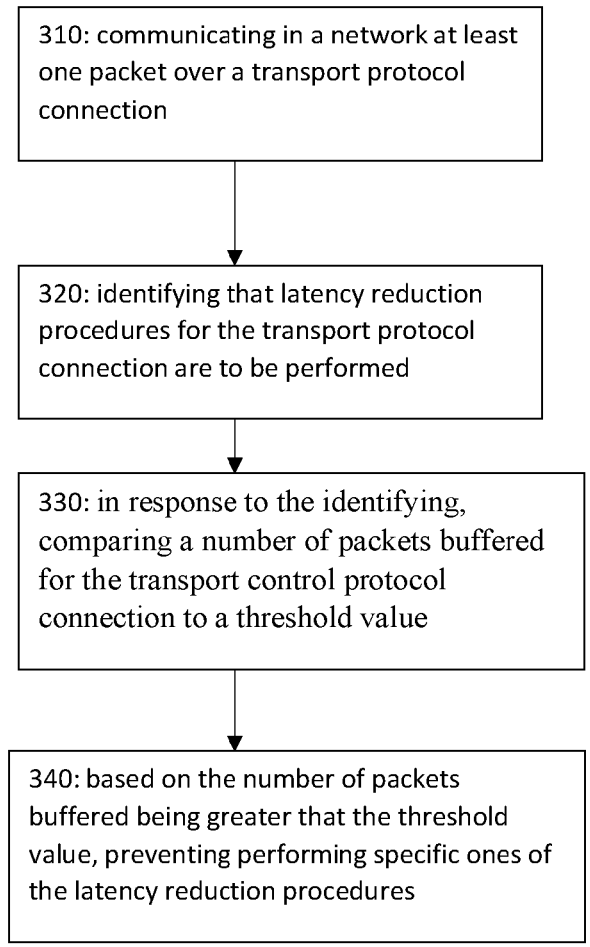
FIG. 3 shows a method in accordance with the example embodiments which may be performed by an apparatus.

FIG. 3 illustrates operations which may be performed by a network device such as, but not limited to, a user equipment (e.g., the UE 200 as in FIG. 2) and/or a network device (e.g., the eNB 220 and/or the Server 240 as in FIG. 2). As shown in step 310 of FIG. 3, there is communicating in a network at least one packet over a transport protocol connection. At step 320 of FIG. 3 there is identifying that latency reduction procedures for the transport protocol connection are to be performed. At step 330 of FIG. 3 there is, in response to the identifying, comparing a number of packets buffered for the transport control protocol connection to a threshold value. Then at step 340 there is, based on the number of packets buffered being greater that the threshold value, preventing performing specific ones of the latency reduction procedures.

In accordance with the example embodiments as described in the paragraph above, the threshold value is received from the network via radio resource control signaling.

In accordance with the example embodiments as described in the paragraphs above, the threshold value is received in a system information broadcast from the network.

In accordance with the example embodiments as described in the paragraphs above, the threshold value is based on a volume of service data units in the buffered packets at the apparatus.

In accordance with the example embodiments as described in the paragraphs above, the threshold value is based on link quality measures.

In accordance with the example embodiments as described in the paragraph above, the link quality measures are using at least one of reference signal received power and reference signal received quality measurements.

In accordance with the example embodiments as described in the paragraphs above, the latency reduction procedures comprise at least one of shortening a transmission time interval; using scheduling requests for short transfers; using preambles from a pool reserved for short transfers; and using a contention-based uplink for the communication.

In accordance with the example embodiments as described in the paragraphs above, the preventing performing specific ones of the latency reduction procedures is performed during a slow start phase of the transport protocol connection.

In accordance with an example embodiment of the invention as described above there is an apparatus comprising: means for communicating in a network [UE 200 and/or eNB 220 and/or Server 240], at least one packet over a transport protocol connection; means for identifying that latency reduction procedures for the transport protocol connection are to be performed; means in response to the identifying, for comparing a number of packets buffered for the transport control protocol connection to a threshold value; and means, based on the number of packets buffered being greater that the threshold value, for preventing performing specific ones of the latency reduction procedures.

In the example aspects of the invention according to the paragraph above, wherein at least the means for communicating, identifying, comparing, and preventing comprises a non-transitory computer readable medium [MEM 204, 224, and/or 254] encoded with a computer program [PROG 208, 228, and/or 258]; and/or [Data 206, 226, and 256] executable by at least one processor [DP 202, 222, and/or 252].

The apparatus may be, include or be associated with at least one software application, module, unit or entity configured as arithmetic operation, or as a computer program or portions thereof (including an added or updated software routine), executed by at least one operation processor, unit or module. Computer programs, also called program products or simply programs, including software routines, applets and/or macros, may be stored in any apparatus-readable data storage medium. A computer program product may comprise one or more computer-executable components which, when the program is run, are configured to carry out at least the embodiments described above by means of FIG. 3 Additionally, software routines may be downloaded into the apparatus.

Figure 4A:
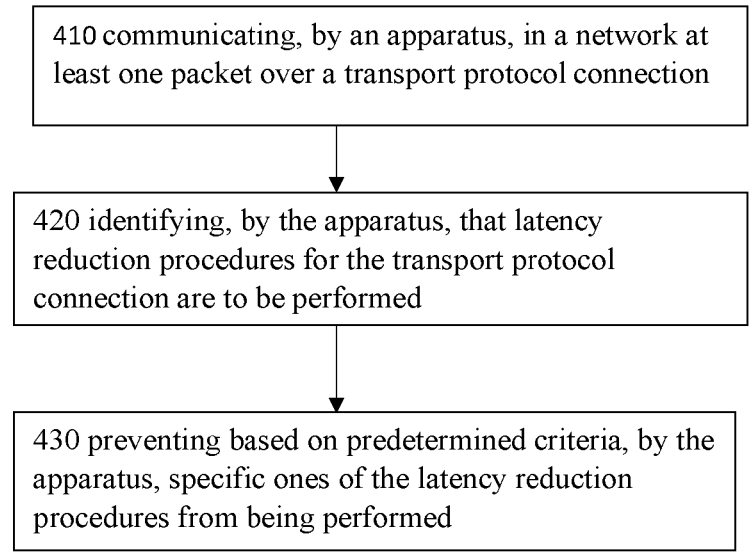
FIGS. 4A and 4B which each show another method in accordance with the example embodiments which may be performed by an apparatus.

FIG. 4A illustrates other operations which may be performed by a network device such as, but not limited to, a user equipment (e.g., the UE 200 as in FIG. 2) and/or a network device (e.g., the eNB 220 and/or the Server 240 as in FIG. 2). As shown in step 410 of FIG. 4A, there is communicating, by an apparatus, in a network at least one packet over a transport protocol connection. At step 420 of FIG. 4A there is identifying, by the apparatus that latency reduction procedures for the transport protocol connection are to be performed. At step 430 of FIG. 4A there is preventing based on predetermined criteria, by the apparatus, specific ones of the latency reduction procedures from being performed.

In accordance with the example embodiments as described in the paragraph above, the predetermined criteria is received in an indication from the network via at least one of radio resource control and system information broadcast signaling, and wherein the predetermined criteria is based on at least one of link quality measures, a transport layer used, a timer value, and at least one threshold.

In accordance with the example embodiments as described in the paragraphs above, the at least one threshold value is based on at least one of the link quality measures and a volume of service data units in buffered packets at the apparatus.

In accordance with the example embodiments as described in the paragraphs above, the timer is used one of alone or in conjunction with a threshold of the at least one threshold to determine whether to allow or prevent latency reduction techniques, and wherein the timer is based on at least one of a transport time and a round trip time of a communicated packet.

In accordance with the example embodiments as described in the paragraphs above, the link quality measures are using at least one of reference signal received power, reference signal received quality, channel state information and channel quality indicator measurements.

In accordance with the example embodiments as described in the paragraphs above, the indication from the network comprises a bitmap indicating the specific ones of the latency reduction procedures that are not to be performed based on the at least one threshold value being one of exceeded or not met.

In accordance with the example embodiments as described in the paragraphs above, when an amount of service data units buffered at packet data convergence protocol is below a threshold of the at least one threshold, the latency reduction procedures comprise at least one of: using a short transmission time interval, using a scheduling request specific for short transfers, and using a preamble for a random access procedure which originates from a separate pool reserved for short transfers, and using a contention-based uplinks.

In accordance with the example embodiments as described in the paragraphs above, the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation, the apparatus is in dual connectivity mode, and a power saving mode is not set at the apparatus; wherein if a power saving mode is set at the apparatus, then the latency reduction procedures are not used.

In accordance with an example embodiment of the invention as described above there is an apparatus comprising: means for communicating [UE 200 and/or eNB 220 and/or Server 240], in a network at least one packet over a transport protocol connection; means for identifying, by the apparatus that latency reduction procedures for the transport protocol connection are to be performed; and means for preventing based on predetermined criteria, by the apparatus, specific ones of the latency reduction procedures from being performed.

In the example aspects of the invention according to the paragraph above, wherein at least the means for communicating, identifying, and preventing comprises a network interface [RX 212, RX232, and/or RX262; TX210, TX230, and/or TX260; and antenna 214, 234, and/or 264], a non-transitory computer readable medium [MEM 204, 224, and/or 254] encoded with a computer program [PROG 208, 228, and/or 258]; and/or [Data 206, 226, and 256] executable by at least one processor [DP 202, 222, and/or 252].

Figure 4B:
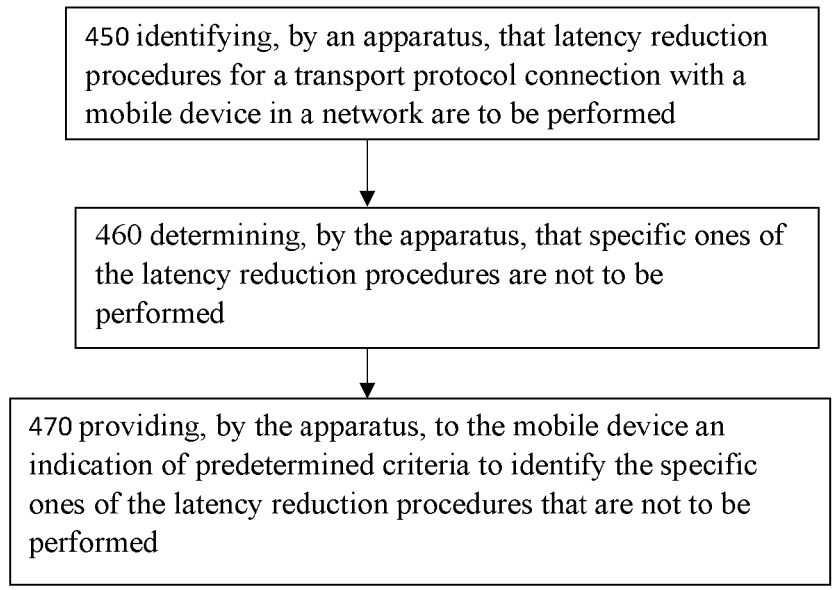

FIG. 4B illustrates other operations which may be performed by a network device such as, but not limited to, a user equipment (e.g., the UE 200 as in FIG. 2) and/or a network device (e.g., the eNB 220 and/or the Server 240 as in FIG. 2). As shown in step 450 of FIG. 4B, there is identifying, by an apparatus, that latency reduction procedures for a transport protocol connection with a mobile device in a network are to be performed. At step 460 of FIG. 4B there is determining, by the apparatus, that specific ones of the latency reduction procedures are not to be performed. At step 470 of FIG. 4B there is providing, by the apparatus, to the mobile device an indication of predetermined criteria to identify the specific ones of the latency reduction procedures that are not to be performed.

In accordance with the example embodiments as described in the paragraph above, the predetermined criteria is provided via at least one of radio resource control and system information broadcast signaling, and wherein the predetermined criteria is based on at least one of link quality measures, a transport layer used, a timer value, and at least one threshold.

In accordance with the example embodiments as described in the paragraphs above, the at least one threshold value is based on a volume of service data units in buffered packets at the mobile device.

In accordance with the example embodiments as described in the paragraphs above, the timer is used one of alone or in conjunction with a threshold of the at least one threshold to determine whether to allow or prevent latency reduction techniques, and wherein the timer is based on at least one of a transport time and a round trip time of a communicated packet.

In accordance with the example embodiments as described in the paragraphs above, the link quality measures are using at least one of reference signal received power, reference signal received quality, channel state information and channel quality indicator measurements.

In accordance with the example embodiments as described in the paragraphs above, the indication comprises a bitmap indicating the specific ones of the latency reduction procedures that are not to be performed based on the at least one threshold value being one of exceeded or not met.

In accordance with the example embodiments as described in the paragraphs above, the indication comprises an indication that the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation, the mobile device is in dual connectivity mode, and a power saving mode is not set at the apparatus; and wherein if a power saving mode is set at the mobile device, then the latency reduction procedures are not used.

In accordance with an example embodiment of the invention as described above there is an apparatus comprising: means for identifying [UE 200 and/or eNB 220 and/or Server 240] that latency reduction procedures for a transport protocol connection with a mobile device in a network are to be performed; means for determining, by the apparatus, that specific ones of the latency reduction procedures are not to be performed; and means for providing, by the apparatus, to the mobile device an indication of predetermined criteria to identify the specific ones of the latency reduction procedures that are not to be performed.

In the example aspects of the invention according to the paragraph above, wherein at least the means for identifying, determining, and providing comprises a network interface [RX 212, RX232, and/or RX262; TX210, TX230, and/or TX260; and antenna 214, 234, and/or 264], non-transitory computer readable medium [MEM 204, 224, and/or 254] encoded with a computer program [PROG 208, 228, and/or 258]; and/or [Data 206, 226, and 256] executable by at least one processor [DP 202, 222, and/or 252].

In general, the various embodiments of the UE 200 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless and/or wired communication capabilities, Internet appliances permitting wireless Internet access and browsing, as well as portable units or terminals that incorporate combinations of such functions.

The embodiments of this invention may be implemented by computer hardware, or by a combination of software and hardware a data processor of the UE 200, eNB 220, and/or Server 240 such as the PROG 208, 228, and/or 258; and/or Data 206, 226, and 256 executable by at least one processor of the DP 202, 222, and/or 252 of FIG. 2. Further in this regard it should be noted that the various blocks of the logic flow diagram of FIGS. 3, 4A, and 4B may represent program steps, or interconnected logic circuits, blocks and functions, or a combination of program steps and logic circuits, blocks and functions. It is noted that any of these devices may have multiple processors (e.g. RF, baseband, imaging, user interface) which operate in a slave relation to a master processor. The teachings may be implemented in any single one or combination of those multiple processors.

The memory such as the Mems 204, 224, and 254 as in FIG. 2 may be of any type suitable to the local technical environment and may be implemented using any suitable data storage technology, such as semiconductor-based memory devices, magnetic memory devices and systems, optical memory devices and systems, fixed memory and removable memory. The data processors DP 202, 222, and 252 may be of any type suitable to the local technical environment, and may include one or more of general purpose computers, special purpose computers, microprocessors, digital signal processors (DSPs) and processors based on a multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   communicating, by an apparatus, in a network at least one packet over a transport protocol connection;
   identifying, by the apparatus, that latency reduction procedures for the transport protocol connection are to be performed, wherein the latency reduction procedures to be performed comprise at least one of: using a short transmission time interval, using a scheduling request specific for short transfers, using a preamble for a random access procedure which originates from a separate pool reserved for short transfers, or using a contention-based uplinks; and
   preventing based on predetermined criteria, by the apparatus, at least one of the latency reduction procedures from being performed, wherein the predetermined criteria is received in an indication from the network via at least one of radio resource control or system information broadcast signaling, and wherein the indication indicates the at least one of the latency reduction procedures that are not to be performed.

2. The method of claim 1, wherein the predetermined criteria is based on at least one of link quality measures, a transport layer used, a timer value, or at least one threshold and wherein the at least one threshold is based on at least one of the link quality measures or a volume of service data units in buffered packets at the apparatus.

3. The method of claim 2, wherein the latency reduction procedures are for a first 100 transmission time intervals of the at least one packet over the transport protocol connection.

4. The method of claim 2, wherein when an amount of service data units buffered at packet data convergence protocol is below a threshold of the at least one threshold, and wherein latency procedures for the transport protocol connection are performed.

5. The method of claim 2, wherein the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the apparatus is in dual connectivity mode, and a power saving mode is not set at the apparatus; wherein if a power saving mode is set at the apparatus, then the latency reduction procedures are not used.

6. An apparatus comprising:
   at least one processor; and
   at least one memory including computer program code, where the at least one memory and the computer program code are configured, with the at least one processor, to cause the apparatus to at least:
   communicate in a network at least one packet over a transport protocol connection;
   identify that latency reduction procedures for the transport protocol connection are to be performed, wherein the latency reduction procedures to be performed comprise at least one of: using a short transmission time interval, using a scheduling request specific for short transfers, using a preamble for a random access procedure which originates from a separate pool reserved for short transfers, or using a contention-based uplinks; and
   prevent based on predetermined criteria at least one of the latency reduction procedures from being performed, wherein the predetermined criteria is received in an indication from the network via at least one of radio resource control or system information broadcast signaling, and wherein the indication indicates the at least one of the latency reduction procedures that are not to be performed.

7. The apparatus of claim 6, wherein the predetermined criteria is based on at least one of link quality measures, a transport layer used, a timer value, or at least one threshold.

8. The apparatus of claim 7, wherein the at least one threshold is based on at least one of the link quality measures or a volume of service data units in buffered packets at the apparatus.

9. The apparatus of claim 7, wherein the timer value is used one of alone or in conjunction with a threshold of the at least one threshold to determine whether to allow or prevent latency reduction procedures, and wherein the timer value is based on at least one of a transport time or a round trip time of a communicated packet.

10. The apparatus of claim 8, wherein the link quality measures are using at least one of reference signal received power, reference signal received quality, channel state information or channel quality indicator measurements.

11. The apparatus of claim 7, wherein the indication from the network comprises a bitmap indicating the at least one of the latency reduction procedures that are not to be performed based on the at least one threshold being one of exceeded or not met.

12. The apparatus of claim 7, wherein when an amount of service data units buffered at packet data convergence protocol is below a threshold of the at least one threshold, and wherein latency procedures for the transport protocol connection are performed.

13. The apparatus of claim 7, wherein the latency reduction procedures are used if at least one of: an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation; the apparatus is in dual connectivity mode, and a power saving mode is not set at the apparatus; and wherein if a power saving mode is set at the apparatus, then the latency reduction procedures are not used.

14. An apparatus comprising:
    at least one processor; and
    at least one memory including computer program code, where the at least one memory and the computer program code are configured, with the at least one processor, to cause the apparatus to at least:
    identify that latency reduction procedures for a transport protocol connection with a mobile device in a network are to be performed, wherein the latency reduction procedures to be performed comprise at least one of: using a short transmission time interval, using a scheduling request specific for short transfers, using a preamble for a random access procedure which originates from a separate pool reserved for short transfers, or using a contention-based uplinks;
    determine that at least one of the latency reduction procedures are not to be performed; and
    provide to the mobile device an indication of predetermined criteria to identify the at least one one of the latency reduction procedures that are not to be performed, wherein the indication of the predetermined criteria is provided via at least one of radio resource control or system information broadcast signaling, and wherein the indication indicates the at least one of the latency reduction procedures that are not to be performed.

15. The apparatus of claim 14, wherein the predetermined criteria is based on at least one of link quality measures, a transport layer used, a timer value, or at least one threshold.

16. The apparatus of claim 15, wherein the at least one threshold is based on a volume of service data units in buffered packets at the mobile device.

17. The apparatus of claim 15, wherein the timer value is used one of alone or in conjunction with a threshold of the at least one threshold to determine whether to allow or prevent latency reduction procedures, and wherein the timer value is based on at least one of a transport time or a round trip time of a communicated packet.

18. The apparatus of claim 15, wherein the link quality measures are using at least one of reference signal received power, reference signal received quality, channel state information, or channel quality indicator measurements.

19. The apparatus of claim 14, wherein the indication comprises a bitmap indicating the at least one of the latency reduction procedures that are not to be performed based on the at least one threshold being one of exceeded or not met.

20. The apparatus of claim 15, wherein the indication comprises an indication that the latency reduction procedures are used if at least one of:
    an amount of data at the apparatus that has been already transmitted is less than a threshold, a block error ratio level or modulation and coding scheme level reported by the apparatus are above a threshold of the at least one threshold, at least one secondary cell is in activated state for the apparatus configured with carrier aggregation;
    the mobile device is in dual connectivity mode, and a power saving mode is not set at the apparatus; and wherein if a power saving mode is set at the mobile device, then the latency reduction procedures are not used.

* * * * *